June 12, 1934.　　　　G. I. RHODES　　　　1,962,696
METHOD OF AND MEANS FOR PROTECTING PIPE LINES AND OTHER
BURIED METALLIC STRUCTURES FROM CORROSION
Filed March 1, 1934　　　3 Sheets-Sheet 1

INVENTOR
GEORGE I. RHODES
BY
ATTORNEYS

June 12, 1934.                G. I. RHODES                 1,962,696
   METHOD OF AND MEANS FOR PROTECTING PIPE LINES AND OTHER
        BURIED METALLIC STRUCTURES FROM CORROSION
                 Filed March 1, 1934      3 Sheets-Sheet 2
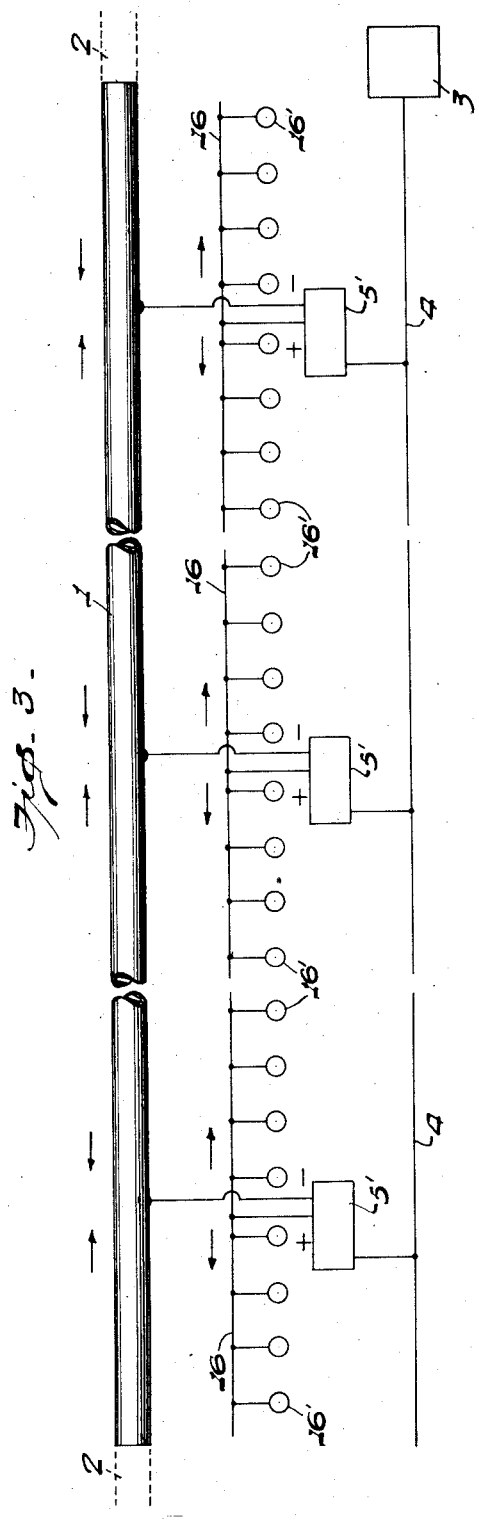
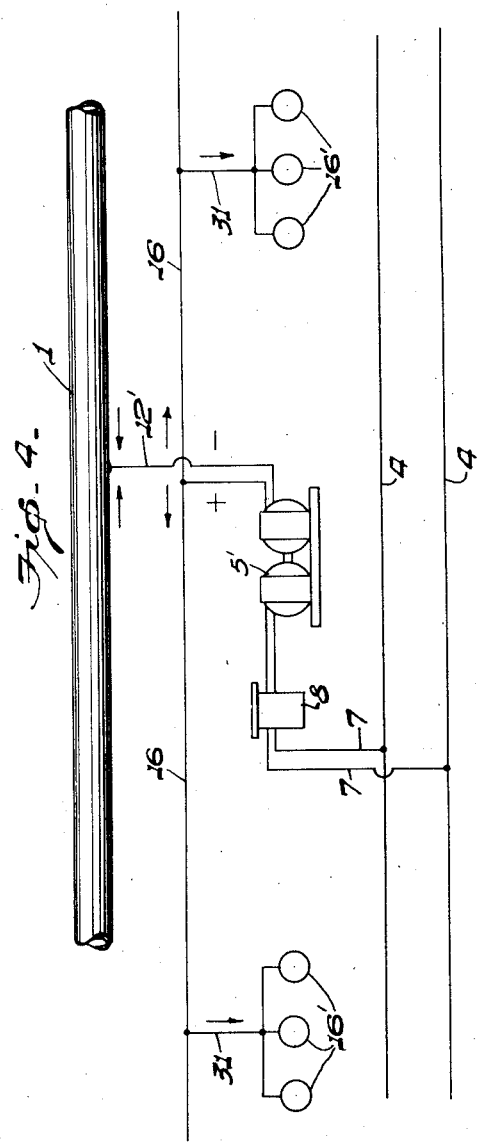
INVENTOR
GEORGE I. RHODES
BY
ATTORNEYS

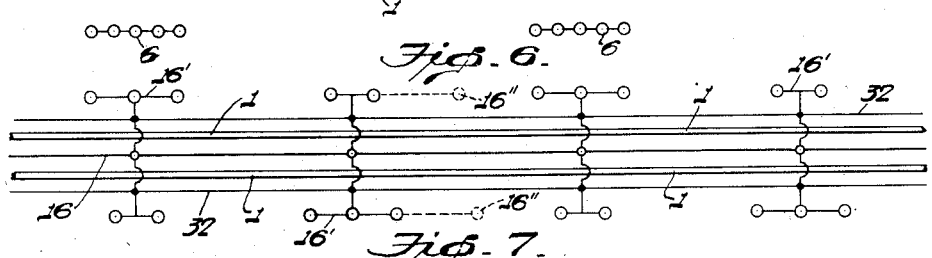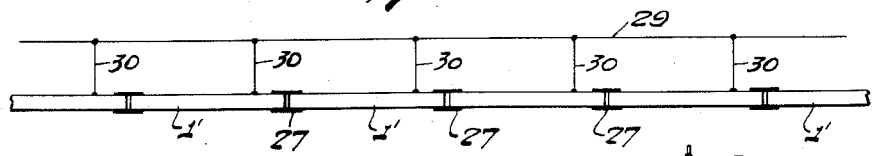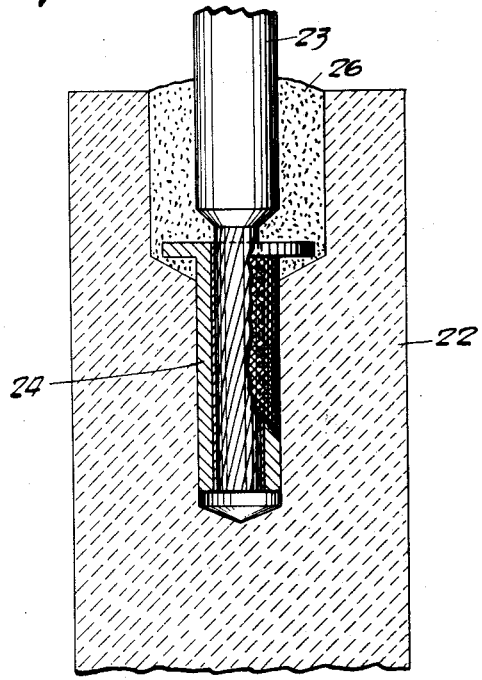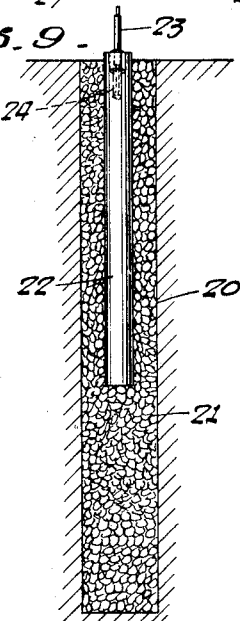

Patented June 12, 1934

1,962,696

UNITED STATES PATENT OFFICE 1,962,696

METHOD OF AND MEANS FOR PROTECTING PIPE LINES AND OTHER BURIED METALLIC STRUCTURES FROM CORROSION

George I. Rhodes, Glen Ridge, N. J.

Application March 1, 1934, Serial No. 713,574

14 Claims. (Cl. 171—316)

This application for patent is a continuation in part of my pending application Serial No. 683,711, filed August 4, 1933. The invention relates to a novel method and means for protecting buried pipe lines, and other buried linear metallic structures from corrosion by maintaining the structures electrically negative to the soil in which they are buried. While not confined thereto, this invention is especially applicable to cross country pipe lines and the like which are either bare or coated with material having low resistivity; and it is advantageous over other methods, in that the amount of energy required to maintain the requisite minimum voltage between the structure to be protected and the surrounding earth is reduced and stray protective currents are largely restricted to the vicinity of the structure.

Linear metallic structures, such as pipe lines used in the transportation of gas, oil, water and the like, are particularly susceptible to corrosion and more or less rapid disintegration, when the soil in which they are buried is of a character to set up electrolytic action between the differing metallic elements of the pipe lines, such as mill scale, rust and steel, and the ground. Such pipe lines are commonly buried in the ground with a covering of soil of from one and one-half to three feet and, where the soil conditions are bad, as, for instance, where the lines pass through low, poorly drained ground or through alkaline soils, the corrosion is extremely rapid and bare or unprotected lines frequently corrode to an extent which renders their replacement necessary in a few years and, in some instances, in as short a time as three years. In some lines, the differences of potential between the pipe and the soil in which the pipe is buried are sometimes in excess of 0.2 volts and irregularities in the chemical nature of the surface of the pipe, such as rust, millscale, etc., which have different contact differences of potential to the earth from that of the pipe, result in the flow of circulating electric currents between pipe and soil causing metal to be removed from the pipe at points where the current leaves the pipe. If the pipe lines are coated with the best of the numerous bituminous materials obtainable and no other steps are taken to prevent corrosion, it is nevertheless sometimes found necessary to replace sections of such coated lines in five years, and long stretches of such lines in as little as ten years, and the problem of maintenance of such lines in operating condition is one of serious difficulty and expense involving the frequent repairing of leaks, due to corrosion.

Heretofore long cross country pipe lines of which the pipe has been well coated with an electrically insulating material have been maintained electrically negative to the ground by connecting the pipe line to the negative terminal of a direct current source of electric energy whose positive terminal is grounded through an artificial ground. Owing to the insulating nature of the coating, the amount of current flowing from the ground to the pipe, when so connected, is small, augmented, however, by any defects that may exist or develop in the insulating coating. No difficulties are encountered in electrically draining even very long sections of pipe lines by such means. The amount of current thus drained from the line is small and, when it is returned to the ground through the artificial ground connections, its meandering through the earth is in such small quantities that no trouble is experienced in respect to increased corrosion of other underground structures. While such methods of maintaining pipe lines negative to the earth are feasible in connection with electrically continuous pipe lines, such as screwed or welded lines or lines with metallic bonds connected around couplings of an insulating nature, they are only practically applicable to long lines, when the electrical conductivity per unit of length from such lines to ground is low as compared with the conductivity of the earth in the vicinity of the pipe lines and of the pipe line itself, or, in other words, a well insulated line.

When the insulating value of the pipe coating is low, previously known methods of maintaining the pipe electrically negative are cumbersome, inefficient and expensive. Required circulating current of the order of ten amperes per mile of pipe line offer little difficulty under known methods. Some lines, however, require in places as much as two hundred and fifty amperes per mile and for long stretches in excess of fifty amperes per mile. Great difficulty and large power consumption are, therefore, involved in former methods in returning such large currents to the earth through the anodes and it has been customary to bury large groups of anodes at some chosen location in wet ground not too far from the pipe line. Even then relatively high voltages have been required, at times up to forty volts.

In the protection of underground metallic structures from corrosion by maintaining them negative to the ground, namely, cathodic protection, popularly called electric drainage, I have found that it is sufficient to maintain them not over 0.5 volt negative to the ground at points at a distance therefrom equal to about ten times the diameter or transverse dimension of the structure to be protected. Of this voltage, some 0.3 volt is represented by back electromotive force and the remainder is represented by the resistance drop resulting from the flow of current through the soil and the coating of the structure. By my invention, the voltages between structure and soil may be maintained substantially down to the desired minimum, thereby reducing the aggregate current and energy required and, through the lessening of the voltage required to force the current back into the ground from the anodes, effecting a reduction of the energy required for that purpose. My invention, therefore, can be applied to result in a material reduction both in current and applied voltage, the reduction being of increasing importance as the coating of the structure to be protected against corrosion is of increasingly poor resistivity.

Generally stated, the invention, in its broad aspect, contemplates sustaining negative polarity of an underground linear metallic structure as referred to the soil in its vicinity by depressing the potential of the structure and elevating the potential of the soil in a cylindroid containing such structure.

In a more specific aspect, the invention contemplates sustaining negative polarity of a buried linear metallic structure as referred to the soil in its vicinity by depressing the potential of the structure and elevating the potential of the earth in a cylindroid containing such structure to an extent not less than a major fraction of the back electromotive force developed at the metallic surface of the structure by the inflow of current and to a substantially uniform extent throughout its length at points substantially equidistant from the structure.

The principal feature of the invention in its relation to means for sustaining the negative electric polarity of the structure to be protected as referred to the soil in its vicinity involves the use of a plurality of low resistance anodes buried in the earth generally adjacent to and distributed along the structure and serving to elevate the potential of the earth along the structure to an extent having an inverse relationship to the distance from the nearest anode, a source or sources of direct electric current, and positive electric conductors interconnecting the positive pole or poles of said source or sources and the anodes, together with negative electric conductors interconnecting the negative pole or poles of such source or sources and the structure to be protected.

A further feature of the invention of the means preferably employed for sustaining a negative electric polarity of an underground linear metallic structure as referred to the soil in its vicinity involves the use of a plurality of low resistance anodes buried in the earth generally adjacent to and distributed along such structure, a source of direct electric current, positive electric conducting means interconnecting the positive pole of such source and the anodes, and a negative electric conductor interconnecting the negative pole of said source and the structure to be protected, said means including a main positive conductor and tap connections between the latter and the anodes, and said tap connections to individual or groups of anodes at locations of excessive negative polarity along said structure being of relatively high resistance, so as only to permit the flow of as much current as is sufficient to develop the required voltage between the structure and earth.

Other features of the invention will hereinafter appear and be particularly pointed out in the claims.

The invention is schematically illustrated in some of its simpler and more preferable forms in the accompanying drawings, in which:—

Figure 3 is a diagram, generally similar to Figure 1, showing another form of the invention.

Figure 4 is a diagram showing certain details of the apparatus illustrated in Figure 3.

Figure 5 is a diagram showing the relative positions of the pipe line and anodes of Figure 1, as they are preferably arranged for multiple pipe lines not too badly coated.

Figure 6 is a diagram showing the relative positions of the pipe line and anodes of Figure 3, as such anodes are preferably arranged for multiple pipe lines that are badly coated.

Figures 7 and 8 are diagrammatic views showing the preferred means of bonding employed, when the sections of pipe line are coupled with joints of an insulating nature.

Figure 9 is a view, partly in elevation and partly in vertical section, showing a preferred form of one of the anodes and its relation to the soil.

Figure 10 is a detail view, partly in elevation and partly in vertical section showing the preferred mode of connecting the positive conductor to the anode.

Figure 1:
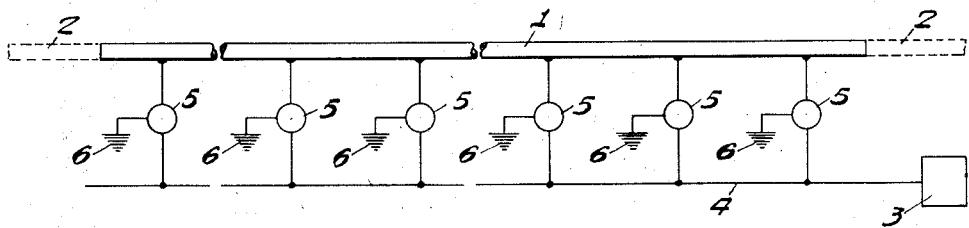
Figure 1 is a diagram of a section of pipe line having the invention applied thereto.
Figure 2:
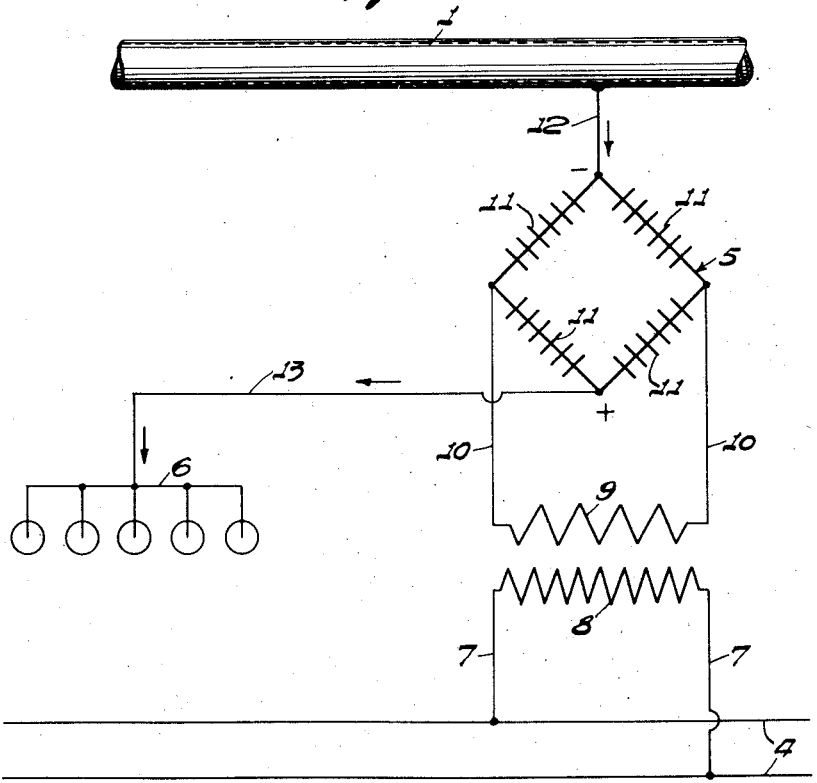
Figure 2 is a diagram, illustrating in detail, certain of the features of Figure 1.

Referring to Figures 1 and 2 of the drawings, 1 indicates a section of the pipe line buried in the ground and 2, 2 indicate the immediately adjacent pipe line sections which are electrically insulated from section 1 and may each be subdivided by suitable insulating couplings into separate electrically isolated parts for reasons hereinafter explained. The section 1 of the line is the particular section which it is desired to drain electrically, so that it will be maintained at a potential negative with respect to the earth in which it is buried. This section, which may have little or no insulating coating, is electrically continuous and may be of conductivity less than that which would result from perfect joining together of the individual pieces of pipe constituting the line. If the line is coupled with joints of an insulating nature, such as the rubber packed couplings frequently used in the natural gas industry, then it is necessary to make the line electrically continuous, which may be conveniently done in the manner shown by Figure 7 or in the manner shown by Figure 8. In Figures 7 and 8, 1' are sections or joints of pipe which are more or less isolated from each other by couplings 27 of an insulating or semi-insulating nature. As shown in Figure 7, conducting bonds 28 connected around the couplings 27 may be used to make the line electrically continuous. These bonds may be similar to the bonds commonly used to connect together the rails of electric railway systems and their size may be chosen to provide the required conductivity. The method of bonding shown in Figure 8 differs from that shown in Figure 7, in that, instead of bonds about the couplings, a conductor 29 is laid along the pipe line and the electrically isolated or partially isolated lengths or joints of pipe 1' are connected thereto by means of wires 30. The conductor 29 should be of a size to afford the required conductivity, but the wires 30 may be relatively small. In Figure 7, as well as in Figure 8, the couplings 27 are shown conventionally, the space between the lines indicating the coupling and those indicating the pipe being intended to indicate electrical insulation or high resistance.

As shown in Figure 1 of the drawings, 3 indicates a source of alternating current, such as an alternating current electric generator, supplying transmission line 4 paralleling the pipe line, the line 4 being located either above or below the ground, as desired. The generator may be of the single phase or of the three phase type. In the diagram, 5 indicates a series of combined transformers and rectifiers disposed at intervals along the pipe line section 1, the transformers taking the current from the transmission line and reducing it to the desired voltage, and the associated rectifiers converting the currents of reduced voltage delivered by the respective transformers into direct current, the negative terminals of the rectifiers being connected to the pipe line section 1 and the positive terminals of said rectifiers being directly connected to earth by suitable ground connections 6.

In the diagram of Figure 1, the pipe line section 1 and the transmission line 4 are shown broken into three parts. The entire section may be many miles long and the breaking of the diagram into three parts is meant to indicate that the entire section of the line may be equipped with many combined transformer and rectifier units 5, spaced as required by the conditions of the various portions of section 1 of the line desired to be electrically drained.

In Figure 2, there is illustrated diagrammatically the mode of application of one of the associated transformer rectifiers, and the description of the same will apply to all the others. As shown, 4, 4 indicate the line wires supplying alternating current, in this case assumed to be single phase, which may be derived from any of the usual commercial sources, if the same are available, or which may be supplied by a special generator and transmission line disposed to parallel the portions of the pipe line to be protected. The primary 8 of the transformer is connected to the transmission line by leads 7 and the secondary 9 of said transformer is connected by leads 10, 10 to two terminals of a quadruple bank of rectifier disks 11, arranged in bridged connection. These rectifier disks 11, which may be of the copper oxide type, are so disposed with respect to each other and to the transformer circuit that the rectifier has the desired current capacity and the terminals connected to the wires 12 and 13 are respectively the negative and positive terminals of the rectifier. Obviously, any other suitable type of commercial transformer and rectifier or motor generator may be employed with equally good effect and the particular type shown is to be regarded as merely exemplary. The negative terminal of the rectifier is connected to the pipe line section 1 by lead 12 and the positive terminal of said rectifier is connected by lead 13 to a grounding device 6 of low resistance. This grounding device may be of any suitable form, but is preferably constituted by a series of carbon rods which are driven into or buried deeply in the ground and surrounded by crushed coke, the upper ends of the rods being connected to the lead 13 in multiple, as shown. While carbon rods are preferred, metallic rods packed in filings, borings, etc., of the same metal, may also be used to advantage. The distances at which the groups of rods are located away from the pipe line are generally dependent on the spacing of the groups along the line and on the arrangement of the rods, a distance from the pipe line of not substantially less than one-tenth of the spacing between the center points of adjacent groups of rods being preferable.

Figures 9 and 10 illustrate a preferred form of individual rod or anode unit which has been found to be satisfactory. A bore hole 20 some six inches in diameter and some ten feet deep is drilled into the soil. The lower four feet of this hole are preferably tightly packed with finely crushed foundry or gas retort coke 21, thoroughly moistened before placing. The carbon rod 22, which is preferably approximately two inches in diameter and six feet in length, is then placed in central position in the hole and crushed and moistened coke is packed around it, preferably to the surface of the ground. Surrounding the carbon rods 22 by crushed coke is advantageous, in that the electrolytic corrosion which has been found to take place, due to the continued passage of electric current from the rods into the ground, is practically confined to the coke, which may be easily renewed when necessary by simply adding fresh coke and tamping it in place in the bore hole 20. The carbon rods 22 are preferably of the type used in electric furnaces and are connected to the several branches of the lead 13 in any well known manner, so as to avoid electrolytic action between the conducting wires and the rods at their juncture. For this purpose, the carbon rod may advantageously be equipped with an insulating wire connection 23 having its end soldered into a knurled copper ferrule 24, which, in turn, is driven into a countersunk hole 25 drilled into the upper end of the rod 22. The insulation of the wire 23 extends into the enlarged portion of the countersunk hole 25 and is sealed therein by any suitable hot sealing compound 26, such as pitch, to keep water away from the metallic parts. For a similar purpose, the upper end of the carbon rod is preferably impregnated with a waterproofing material for a distance extending downwardly to or slightly beyond the lower end of the ferrule 24.

As hereinbefore stated, it is preferable that the sections of pipe line immediately adjacent to the section to be electrically drained should be broken up into electrically insulated elements, for a distance of one hundred feet, for example, by providing insulating or semi-insulating couplings between the various joints of pipe. This is desirable for the reason that, if the sections 2, 2 on either side of the section 1, which is to be drained, are electrically continuous and extend for some distance on either side thereof, and, if the section 1 is maintained negative to the ground, the direction of flow of the currents in the ground will be such that there will be a tendency to make the sections 2, 2 positive to the ground in the vicinity of the junction between the sections 2 and the section 1, thus inducing corrosion in the sections 2. It is, therefore, desirable and, in some instances, necessary that, when an electric drainage is applied to a section of pipe line, the drained section be isolated from the undrained parts or sections in the line by immediate sections or portions of the line which are not electrically continuous.

As stated, the corrective currents may be supplied by motor generator sets connected to the supply line and to the pipe line or other buried structure at predetermined intervals to render the whole pipe line or any given section thereof negative to the earth to an extent sufficient to counteract the corrosion producing factors. Such an installation is illustrated in Figures 3 and 4 and is preferred in cases in which the initial cost and the cost of maintenance of a large number of small capacity transformer rectifier units would be prohibitive, or where large currents per unit of length are required. As shown in Figure 3, the section 1 of the pipe line to be protected is insulated from adjacent sections 2, which latter are rendered electrically discontinuous by insulating couplings, as described in connection with the insulation illustrated in Figure 1. The section 1, which is electrically continuous, may be of any length and is connected at intervals by leads 12' with the negative terminals of the motor generator sets 5', supplied from a power line 4 and generating station 3, the positive terminals of the motor generators being grounded by electrodes 16' buried in the earth in the vicinity of the pipe line. The positive pole of each motor generating set is connected to a cable 16, which latter parallels the pipe line and is connected to the earth at intervals by the artificial grounds 16', each ground comprising one or more electrodes buried in the earth, said electrodes being preferably carbon rods 22 of the general character hereinbefore described. In this application of the invention, the spacing of the connections of the negative terminals of motor generators to the pipe line, and the spacing of the electrodes 16' from the pipe line and from each other are such that the voltage between the pipe line and the ground does not vary materially along the pipe line.

As shown in Figure 4, each motor generator set 5' is connected to the line 4, 4 through a transformer 8 by leads 7, 7, the negative terminal of the set being connected to the pipe line by lead 12' and the positive terminal to the earth electrodes 16', which may be a single carbon rod or a group of such rods connected to the common cable 16, which is connected to the positive pole of the motor generator set. The wires 31 connecting the earth electrodes 16' to the common cable 16 may be of resistance adjusted to permit only enough current to flow to develop the required voltage between the pipe line and earth. At locations where the coating resistance of the pipe line is abnormally high, or the impressed voltage is too high, as may be the case near the current source, the voltage will be higher than necessary and it can be corrected by inserting resistance in the appropriate tap wires 31. A like result may be accomplished by removing one or more of the carbon rods from the group of electrodes at the point where the voltage is unnecessarily high.

When more than one line of pipes or other linear structures are close together, such as being on the same right of way, or when the coating on a single line is electrically poor, it is some times desirable to have artificial grounds or anodes on both sides thereof, as indicated in Figures 5 and 6, which apply respectively to the exemplifications of the invention illustrated in Figures 1 and 3. As it is the primary purpose of Figures 5 and 6 merely to show relative locations of anodes and pipe desirable under certain circumstances, it will be understood that, although each of these figures of the drawings discloses two pipe line sections 1, the arrangement of anodes there illustrated may be employed in conjunction with a single section of pipe line; and, for the same reason, these figures of the drawings have not included the transformer rectifier units and wires or the motor generator sets and their connections heretofore described. Figure 5 shows an arrangement of groups of anodes satisfactory for multiple lines not too badly coated, the numbered parts corresponding to like numbered parts in Figure 1. Figure 6 shows an arrangement of groups of anodes satisfactory for badly coated lines, the numbered parts corresponding to like numbered parts in Figure 3. The last mentioned figure also shows an arrangement of wires which may be conveniently employed when, as is almost invariably the case, the pipe to be electrically drained is paralleled by a telephone line on the same right of way. As shown in this figure, the cable 16 connected to the motor generator set may be carried on the telephone poles and be connected to insulated wires 32 buried in the earth on opposite sides of the pipe line and extending along the same. The groups of anodes 16' are connected to the wires 32, each carbon rod thereof being immediately connected to the adjacent wire 32, if desired. Accordingly as the coating of the pipe line is poorer for a given soil resistivity, the longitudinal spacing of the groups of anodes should be less in its ratio to the normal distance of the anodes from the line.

While, in general, a more or less uniform or symmetrical spacing of anodes or groups of anodes throughout the length of the structure to be protected is preferred, a closer spacing is required when the relative resistivity of the pipe coating is low as compared with the resistivity of the soil, than is required when such relative resistivity is high. In localized spots, however, where the soil resistivity is low between adjacent anodes or groups of anodes, for example, where a slough or wet spot intervenes, the augmented flow of current will reduce the earth potential below normal and it is, therefore, some times necessary to provide supplementary anodes 16", connected to the nearest group of anodes, as shown in Figure 6, to correct such depression of earth potential below the desired normal. Where the pipe coating is of an especially low resistivity in spots, such as would cause an augmented flow of current onto the structure at such points reducing the earth potential below that desired, additional anodes may be added to the groups or employed individually to correct such reduction of earth potential.

As heretofore noted, practically every pipe line that would warrant electric drainage is paralleled by a telephone line on the same right of way. With ordinary rectifiers, such as may be used in practicing the invention, the current flowing in the ground and in the positive and negative feeders is of a pulsating rather than a steady nature, for, in rectifying alternating current, the negative half waves are reversed, so that the current is a series of half alternating current waves, and, if sixty cycle current is used, there will be one hundred and twenty such half waves per second. This pulsating current will have some detrimental effect on the performance of the telephone system, but such effect may be avoided if the installations are so made that, at any rectifier, the currents flowing to the rectifier and from the rectifier from both directions are substantially equal or, if not equal, that the greater current shall flow for a shorter distance than the lesser current. The proper balance of current and length in each direction may be controlled by the number or groups of electrodes in the two directions that are fed by given rectifiers.

As a marked reduction in energy required to prevent corrosion is obtained by maintaining the pipe line or other equivalent structure at a substantially uniform negative electric polarity, and as the flow of current along the pipe to the point or points of its connection to the current source or sources causes the structure to be at a lower potential near such point or points than elsewhere, it is desirable to avoid any excessive super-depression of structure potential resulting from the flow of current along the structure by appropriately reducing the spacing of the points of connection between the structure and the current sources. The extent of this super-depression is dependent, in large measure, on the relative resistances from end to end of the structure itself and of the structure to the earth and, accordingly, the spacing of the points of connection of the current sources to the structure may be suitably fixed.

It has been found that, by my invention, the structure may be effectively protected against corrosion by anodes generally adjacent to and distributed along the structure, which are of such size and number that the voltage applied thereto is not required to exceed twenty times the desired negative polarity of the structure as referred to the soil in its vicinity. Along the line parallel with the structure intermediate between the structure and the anodes at a distance from the structure about five diameters thereof, the potential of the earth is elevated by the flow of current from the anodes through the soil to a varying degree largely dependent at any point upon the distance of that point from the nearest anode and in an inverse relationship thereto. As such variation is less accordingly as the ratio of linear separation of anodes to their normal distance from the pipe line is smaller, its extent may be readily controlled. Within about five diameters of the pipe, or the equivalent with other structures, there is a rapid decline in earth potential towards the pipe.

As a result of locating and adjusting the anodes, as described, to minimize the voltage between earth and pipe and make it uniform or substantially uniform, the current flow is minimized with a two fold reduction in energy, that due directly to the lower current flow consequent upon the maintenance of substantially uniform voltage between the earth and the pipe, and that due to the lower voltage required to force the lesser current through the circuit. Since the resultant difference in voltage between the pipe and the earth is the sum of the elevation of earth potential and the depression of pipe potential, the nearby location of the anodes results in a greater difference in voltage than would obtain with a more remote location, and the same total circuit voltage. Hence there is a further reduction in energy consumption for a given result due to the elevation of earth potential.

It is apparent that the invention provides means whereby long or short pipe lines, or the like, of any size or condition of coating may be effectively maintained negative to the earth so as to protect them from corrosion with a minimum expenditure of energy and meandering of stray protective currents from the vicinity of the pipe line.

The foregoing explanation of the principle of the invention and the best mode in which it is contemplated applying the same will enable it to be employed for protecting any buried pipe line or linear metallic structure by ordinary expedients in the design of transmission lines or other means to supply energy to the direct current energy sources, and in the design of conductors connecting such sources to the anodes and to the structure to be protected.

What I claim is:

1. The method of sustaining negative polarity of an underground linear metallic structure as referred to the soil in its vicinity, which comprises depressing the potential of said structure and elevating the potential of the earth in a cylindroid containing such structure.

2. The method of sustaining negative polarity of an underground linear metallic structure as referred to the soil in its vicinity, which comprises depressing the potential of said structure and elevating the potential of the earth in a cylindroid containing such structure to an extent exceeding a major fraction of the back electromotive force developed at the metallic surface of said structure through the depression of its potential.

3. The method of sustaining negative polarity of an underground linear metallic structure as referred to the soil in its vicinity, which comprises depressing the potential of said structure and elevating the potential of the earth in a cylindroid containing such structure to a substantially uniform extent throughout its length.

4. The method of sustaining negative polarity of an underground linear metallic structure as referred to the soil in its vicinity, which comprises depressing the potential of said structure and elevating the potential of the earth in a cylindroid containing such structure to an extent exceeding a major fraction of the back electromotive force developed at the metallic surface of said structure through the depression of its potential and to a substantially uniform extent throughout its length.

5. Means for sustaining a negative electric polarity of an underground linear metallic structure as referred to the soil in its vicinity, which comprises a plurality of low resistance anodes buried in the earth adjacent to and distributed along said structure, a source of direct electric current, a positive electric conductor interconnecting the positive pole of said source and said anodes and a negative electric conductor interconnecting the negative pole of said source and said structure.

6. Means for sustaining a negative electric polarity of an underground linear metallic structure as referred to the soil in its vicinity, which comprises a plurality of low resistance anodes buried in the earth adjacent to and distributed along said structure, a plurality of sources of direct electric current, positive electric conductors interconnecting the positive poles of said source and said anodes, and negative electric conductors connecting the negative pole of said sources and said structure at points spaced along the latter.

7. Means for sustaining a negative electric polarity of an underground linear metallic structure as referred to the soil in its vicinity, which comprises a plurality of anodes buried in the earth adjacent to and distributed along said structure, said anodes being of a size and number such that the voltage applied thereto need not exceed twenty times the desired negative polarity of said structure as referred to the soil in its vicinity, a source of direct electric current, a positive electric conductor interconnecting the positive pole of said source and said anodes, and a negative electric conductor interconnecting the negative pole of said source and said structure.

8. Means for sustaining a negative electric polarity of an underground linear metallic structure as referred to the soil in its vicinity, which comprises a plurality of low resistance anodes buried in the earth adjacent to and distributed along said structure in generally symmetrical spacing throughout its length, one or more supplementary anodes adjacent to said structure at points corresponding to locations of deficient negative polarity of the structure, a source of direct electric current, a positive electric conductor interconnecting the positive pole of said source and said anodes, and a negative electric conductor interconnecting the negative pole of said source and said structure.

9. Means for sustaining a negative electric polarity of an underground linear metallic structure as referred to the soil in its vicinity, which comprises a plurality of low resistance anodes buried in the earth adjacent to and distributed along said structure, a source of direct electric current, a positive electric conductor interconnecting the positive pole of said source and said anodes, said positive conductor including relatively high resistance tap connections for the individual anodes at locations of excessive negative polarity, and a negative electric conductor interconnecting the negative pole of said source and said structure.

10. Means for sustaining a negative electric polarity of an underground linear metallic structure as referred to the soil in its vicinity, which comprises a plurality of spaced groups of low resistance anodes buried in the earth adjacent to and distributed along said structure, a source of direct current, a positive electric conductor interconnecting the positive pole of said source and said anodes, said positive conductor including relatively high resistance tap connections for the groups of anodes at locations of excessive negative polarity, and a negative electric conductor interconnecting the negative pole of said source and said structure.

11. Means for sustaining a negative electric polarity of an underground linear metallic structure as referred to the soil in its vicinity, which comprises a plurality of low resistance anodes buried in the earth and distributed along said structure, said anodes being disposed at a distance from said structure of not substantially less than one-tenth of the distance by which they are spaced from each other, a source of direct electric current, a positive electric conductor interconnecting the positive pole of said source and said anodes, and a negative electric conductor interconnecting the negative pole of said source and said structure.

12. Means for sustaining a negative electric polarity of an underground linear metallic structure as referred to the soil in its vicinity, which comprises a plurality of groups of low resistance anodes buried in the earth and distributed along said structure in spaced relation, said groups of anodes being disposed at a distance from said structure of not substantially less than one-tenth of the distance between the center points of said groups, a source of direct electric current, a positive electric conductor interconnecting the positive pole of said source and said groups of anodes, and a negative electric conductor interconnecting the negative pole of said source and said structure.

13. Means for sustaining a negative electric polarity of an underground linear metallic structure as referred to the soil in its vicinity, which comprises a plurality of anodes buried in the earth adjacent to and distributed along said structure, each anode including a rod of conducting material surrounded with finely divided material of the same kind extending substantially to the surface of the ground, a source of direct electric current, a positive electric conductor interconnecting the positive pole of said source and said anodes, and a negative electric conductor interconnecting the negative pole of said source and said structure.

14. Means for sustaining a negative electric polarity of an underground linear metallic structure as referred to the soil in its vicinity, which comprises a plurality of anodes buried in the earth adjacent to and distributed along said structure, each anode including a rod of carbon surrounded with crushed foundry or retort coke extending substantially to the surface of the ground, a source of direct electric current, a positive electric conductor interconnecting the positive pole of said source and said anodes, and a negative electric conductor interconnecting the negative pole of said source and said structure.

GEORGE I. RHODES.